R. MALCOM.
EYE SHIELD.
APPLICATION FILED OCT. 21, 1907.
1,031,859.
Patented July 9, 1912.
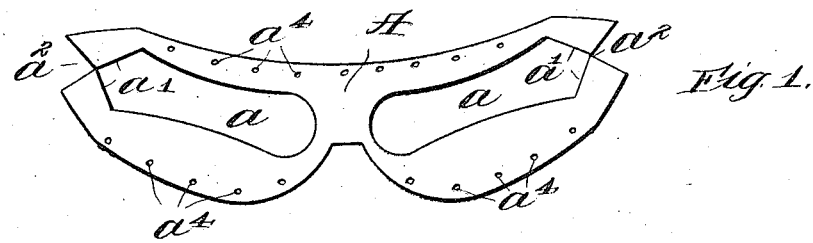
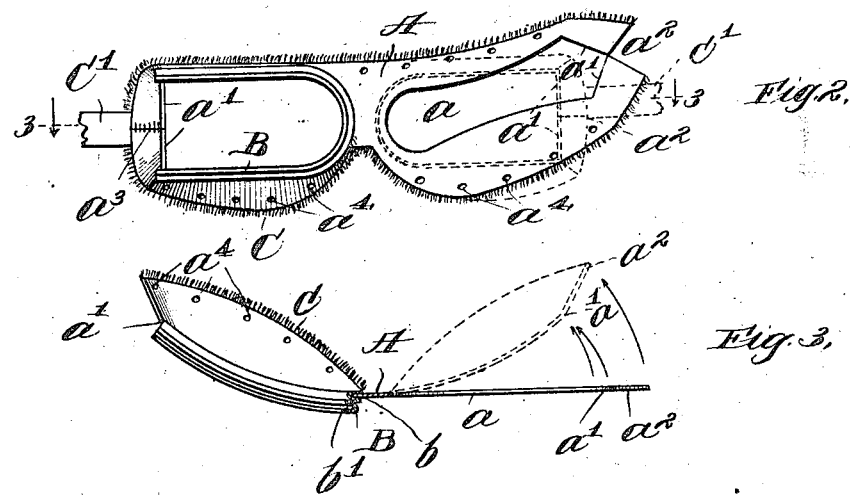
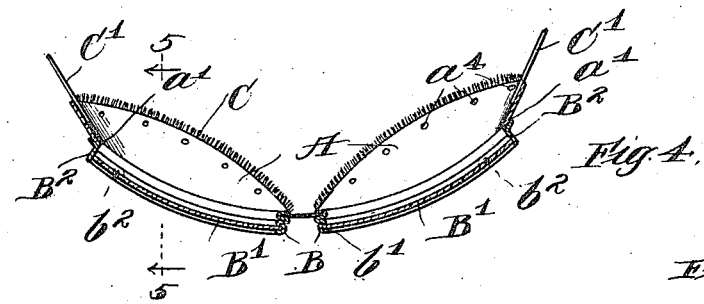
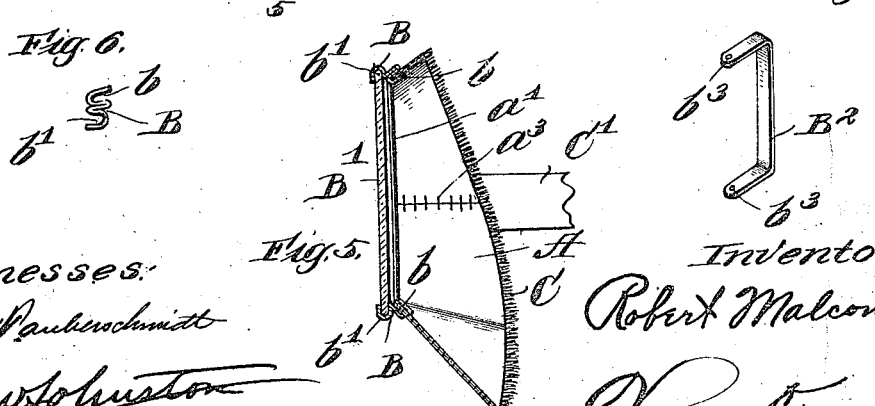

UNITED STATES PATENT OFFICE.

ROBERT MALCOM, OF CHICAGO, ILLINOIS.

EYE-SHIELD.

1,031,859.

Specification of Letters Patent. Patented July 9, 1912.

Application filed October 21, 1907. Serial No. 398,417.

*To all whom it may concern:*

Be it known that I, ROBERT MALCOM, a citizen of the United States, residing at Chicago, Cook county, Illinois, have invented certain new and useful Improvements in Eye-Shields, of which the following, taken in connection with the drawing, is a description.

My invention has for its object the production of an eye shield designed to be used by motormen, automobilists, and others who are exposed to the wind and dust. The eye shield is so constructed that the flexible portion thereof stands out and away from the face; but the rim conforms closely to the features of the face, thereby affording complete protection against dust, dirt, cinders or the like, which would injure the eyes.

Another object of my invention is to provide such an eye shield having a wide range of vision at the sides as well as directly in front of the eyes, without having hinges or other dark lines to obstruct the vision. I accomplish these purposes by providing a curved lens which extends far enough around the side of the face to afford an unobstructed vision to the right or left.

Other objects and advantages will be hereinafter more clearly explained and pointed out in the claims.

In the accompanying drawings forming part of this specification, and in which like letters of reference indicate corresponding parts, I have illustrated one form of device embodying the essential features of my invention, although the same may be carried into effect in other ways without in the least departing from the spirit of my invention, and in these drawings: Figure 1 is a plan view of the blank forming the flexible frame and to which are secured the rims for holding the lenses; Fig. 2 is a front elevation of my eye shield having one end thereof finished and one end in blank form; Fig. 3 is a sectional view taken on line 3—3 of Fig. 2; Fig. 4 is a longitudinal sectional view taken through the completed shield; Fig. 5 is an enlarged transverse section taken on line 5—5 of Fig. 4; Fig. 6 is a sectional view of the metal rim for holding the lenses; Fig. 7 is a detail of the end frame holding the lenses in the rim.

In carrying out my invention I provide a body portion or frame A of suitable flexible material, which may be leather, wire gauze, celluloid or any other light flexible material, strong enough to support the lenses in position and preserve the necessary contour to keep the shield extended away from the face of the wearer. Elongated apertures $a$ are provided in the blanks for the lenses, the outer ends of these apertures being cut V-shaped as shown at $a'$. Notches $a^2$, $a^2$, one or more as desired, are cut into the blank A, as shown in Fig. 1. The edges of these notches are brought together and stitched or otherwise secured as shown at $a^3$, thus making a straight edge of the angle formed by the V-shaped notches $a'$, Fig. 2. The frame A is thus formed into shape so that only the edges thereof will come into contact with the face, and will allow plenty of room for circulation of air, or to cover glasses or spectacles, if either are worn. Perforations $a^4$ may be arranged in the frame A for ventilation if desired.

U-shaped metal rims B, B, are formed of a single piece of material as shown in Fig. 6. These are curved longitudinally and bent to form an outside and an inside groove $b$, $b'$ respectively, and extend around the apertures $a$ from the corners formed by the line $a'$. A small lug $b^2$ is provided near each end of the rim. The edges of the material A surrounding the apertures $a$ are clamped in the groove $b$ and firmly held in place. Curved lenses of any suitable transparent material are extended into the inwardly opening grooves $b'$ of the rims B' from the open ends thereof. An end rim $B^2$ having the corners bent at right angles thereto, and having the apertures $b^3$ therein is fitted over the end of each lens B', the apertures $b^3$ engaging the lugs $b^2$ on the rim B to retain said lens in place. This end rim may be hinged at one end if desired.

C is the outer rim binding of chenille or like material extending around the entire frame. Such a binding precludes any dust or small particles of any kind from being blown under the frame, as the nap of the material lies close to the face of the wearer. This binding, however, may be dispensed with, if desired.

C' is an elastic cord or the like which is to be secured around the head of the wearer to hold the shield in place.

I claim:

1. In an eye shield, a frame having lens apertures cut therein and notches extending from the outer edges of said frame to the aforesaid apertures, the edges of the frame being drawn together and secured at the notches to extend the body of the frame away from the face, curved lenses, a metallic lens holding frame for each lens, and means on said frame for engaging the eye shield frame and holding each lens in place, substantially as described.

2. In an eye shield, the combination of a flexible frame having lens apertures cut therein, metallic rims surrounding said apertures, said rim being curved longitudinally and having grooves extending lengthwise of the same, one of said grooves engaging the flexible frame and the other engaging the lens, substantially as described.

3. In an eye shield, the combination of a flexible frame, U-shaped longitudinally curved lens holding rims, each of said rims having an outwardly and an inwardly opening groove therein, curved lenses having one end thereof straight and the other circular, each lens being held in the inwardly opening groove in each rim, and means abutting the straight edge of the lens to hold the same in place, substantially as described.

4. In an eye shield, the combination of a flexible ventilated frame having lens apertures and notches cut therein and the edges of said notches secured together, a flexible binding surrounding said frame, U-shaped longitudinally curved metallic rims surrounding the aforesaid apertures, and longitudinally curved lenses removably secured in said rims, substantially as described.

5. An eye shield having a flexible ventilated frame with lens apertures cut therein, U-shaped longitudinally curved metallic rims surrounding said apertures, longitudinally curved lenses removably secured in grooves formed in the aforesaid rims, and means for holding the lenses in the rims, substantially as described.

6. An eye shield having a flexible ventilated frame with elongated apertures therein, U-shaped metallic rims secured around said apertures, each of said rims having an outwardly opening and an inwardly opening groove, the aforesaid frame being secured in the outwardly opening groove, and a longitudinally curved lens secured in each of the aforesaid inwardly opening grooves, substantially as described.

In testimony whereof I have signed this specification in the presence of two subscribing witnesses.

ROBERT MALCOM.

Witnesses:
G. W. JOHNSTON,
H. C. PRIEBE.

Copies of this patent may be obtained for five cents each, by addressing the "Commissioner of Patents. Washington, D. C."